Sept. 26, 1961 R. M. HUBBARD 3,002,145

FULL-WAVE MAGNETIC AMPLIFIERS

Filed July 22, 1959 2 Sheets-Sheet 1

INVENTOR.
ROBERT M. HUBBARD

BY K. W. Thomas

ATTORNEY

Sept. 26, 1961 R. M. HUBBARD 3,002,145

FULL-WAVE MAGNETIC AMPLIFIERS

Filed July 22, 1959 2 Sheets-Sheet 2

INVENTOR.
ROBERT M. HUBBARD

BY K. H. Thomas

ATTORNEY

United States Patent Office 3,002,145
Patented Sept. 26, 1961

3,002,145

FULL-WAVE MAGNETIC AMPLIFIERS

Robert M. Hubbard, Kent, Wash., assignor to Boeing Airplane Company, Seattle, Wash., a corporation of Delaware Filed July 22, 1959, Ser. No. 828,749
11 Claims. (Cl. 323—89)

This invention relates to magnetic amplifiers and, more particularly, to magnetic amplifiers comprising two stages in which the two stages alternately effect a flow of current through a common load.

The subject application is related to patent applications Serial Nos. 828,750 and 828,783, entitled "Magnetic Amplifiers" and "Time Delay Circuits," respectively, and filed even date herewith by Robert M. Hubbard.

There are several types of two-stage magnetic amplifiers in which the two stages alternately effect a flow of current through a common load. However, these prior art magnetic amplifiers are somewhat complex and thus the original cost of these magnetic amplifiers is also somewhat high. Therefore, an object of this invention is to provide for simplifying a full-wave magnetic amplifier having a first and a second stage in which the two stages alternately effect a flow of current through a common load.

Another object of this invention is to provide for simplifying and minimizing the response time of a full-wave magnetic amplifier, by connecting the reset circuit of one magnetic core in parallel circuit relationship with the gate circuit of another magnetic core to establish two stages which alternately effect a flow of current through a common load and by controlling only the magnetic core of the first stage so as to achieve half-cycle response in each stage.

A further object of this invention is to provide for further simplifying the full-wave magnetic amplifier of the previous object by so disposing and interconnecting a single winding on the magnetic core of the second stage that the winding functions to effect both a gating and a resetting of the magnetic core.

A still further object of this invention is to provide a simple and better performing full-wave reversible-phase alternating-current output magnetic amplifier.

Still another object of this invention is to provide a simple full-wave magnetic amplifier which can be readily changed from a reversible-phase alternating-current output to a reversible polarity direct-current output by the interchange of two circuit connections.

Other objects of this invention will become apparent from the following description when taken in conjunction with the accompanying drawings in which.

Figure 1:
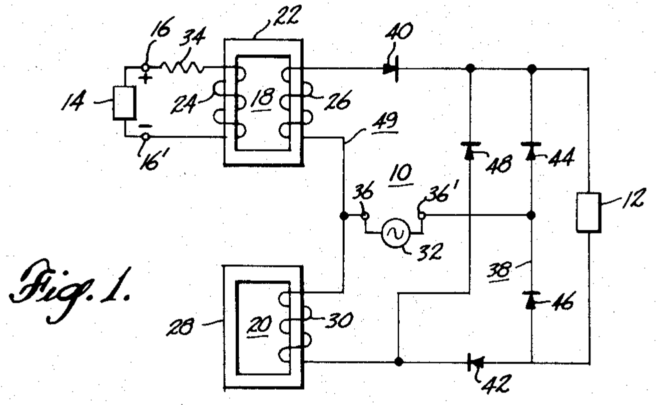
FIG. 1 is a schematic diagram of a full-wave direct-current magnetic amplifier embodying teachings of this invention and which is adapted to be controlled by a non-reversible direct-current control voltage.

Referring to FIG. 1 there is illustrated a full-wave magnetic amplifier 10 embodying teachings of this invention and which is adapted to effect a direct-current voltage across a load 12 in accordance with the magnitude of the output voltage of a non-reversible direct-current control source 14. As illustrated, the control source 14 is connected to control terminals 16 and 16′, the polarity of the output voltage of the source 14 being as shown in FIG. 1.

In general, the magnetic amplifier 10 comprises two stages 18 and 20, which alternately effect a flow of current through the load 12, to thereby effect a direct-current voltage thereacross. The stage 18 includes a magnetic core member 22 having a reset winding 24 and a gate winding 26 disposed in inductive relationship therewith. In practice, the reset winding 24 is so wound on the magnetic core member 22 that current flowing therethrough effects a flux which opposes the flux produced by the current flow through gate winding 26. On the other hand, the stage 20 includes a magnetic core member 28 which has a winding 30 disposed in inductive relationship therewith.

In order to effect a resetting of the magnetic core member 22, only during alternate half-cycles of the output of an alternating-current supply source 32, the reset winding 24 is connected in series circuit relationship with a current-limiting resistor 34, the series circuit being connected across the control terminals 16 and 16′. In operation, the current-limiting resistor 34 functions to effect a high impedance for the control circuit, including the reset winding 24 and the resistor 34, during the gating of the magnetic core member 22 so as to permit a proper gating thereof.

As shown, the supply source 32 is connected to supply terminals 36 and 36′, the supply terminals 36 and 36′ being connected to the input diagonal of a Wheatstone bridge 38, the output diagonal of which is connected to the load 12. In particular, one leg of the Wheatstone bridge 38 includes a rectifier 40 and the gate winding 26. Another leg of the Wheatstone bridge 38 includes a rectifier 42 and the winding 30, of the second stage 20. The third and fourth legs of the Wheatstone bridge 38 include a rectifier 44 and a rectifier 46, respectively.

In accordance with this invention, the winding 30, of the stage 20, is connected in series circuit relationship with a rectifier 48, the series circuit being connected in parallel circuit relationship with the series circuit including the rectifier 40 and the gate winding 26, of the stage 18, to thus establish a parallel circuit 49. Thus, the magnetic core member 28, of the stage 20, is reset in accordance with the gating of the magnetic core member 22, of the stage 18, and therefore is reset the same amount as the magnetic core member 22 is reset by the current flow through its reset winding 24.

The operation of the magnetic amplifier 10 will now be described. Assuming the supply terminal 36′ is at a positive polarity with respect to the supply terminal 36, control current flows from the control terminal 16 through the current-limiting resistor 34 and the reset winding 24, to the control terminal 16′, to thereby effect a resetting of the magnetic core member 22 in accordance with the magnitude of the output voltage of the control source 14. Simultaneously, current flows from the supply terminal 36′ through the rectifier 44 in the forward direction, the load 12, the rectifier 42 in the forward direction, and the winding 30, to the supply terminal 36, to thus effect a gating of the magnetic core member 28. During this half-cycle of operation, substantially all of the voltage appearing across the supply terminals 36 and 36′ appears across the winding 30 until the magnetic core member 28 saturates and then substantially all of this supply voltage appears across the load 12.

During the next half-cycle of operation, when the supply terminal 36 is at a positive polarity with respect to the supply terminal 36′, current flows from the supply terminal 36 through both branches of the parallel circuit 49, the load 12, and the rectifier 46 in the forward direction, to the supply terminal 36′, to thereby effect a gating of the magnetic core member 22 and a resetting of the magnetic core member 28 in accordance with the flux level to which the magnetic core member 22 had been reset during the previous half-cycle of operation. Until the magnetic core member 22 saturates, substantially all the voltage appearing across the supply terminals 36 and 36′ appears across the gate winding 26 and the winding 30; however, when the magnetic core member 22 saturates, substantially all of the voltage appearing across the supply terminals 36 and 36′ appears across the load 12. The previously described cycle of operation is then repeated during each subsequent cycle of operation. Thus, the stages 18 and 20 alternately effect a flow of current through the load 12, to thereby produce across the load 12 a full-wave direct-current voltage.

Figure 2:
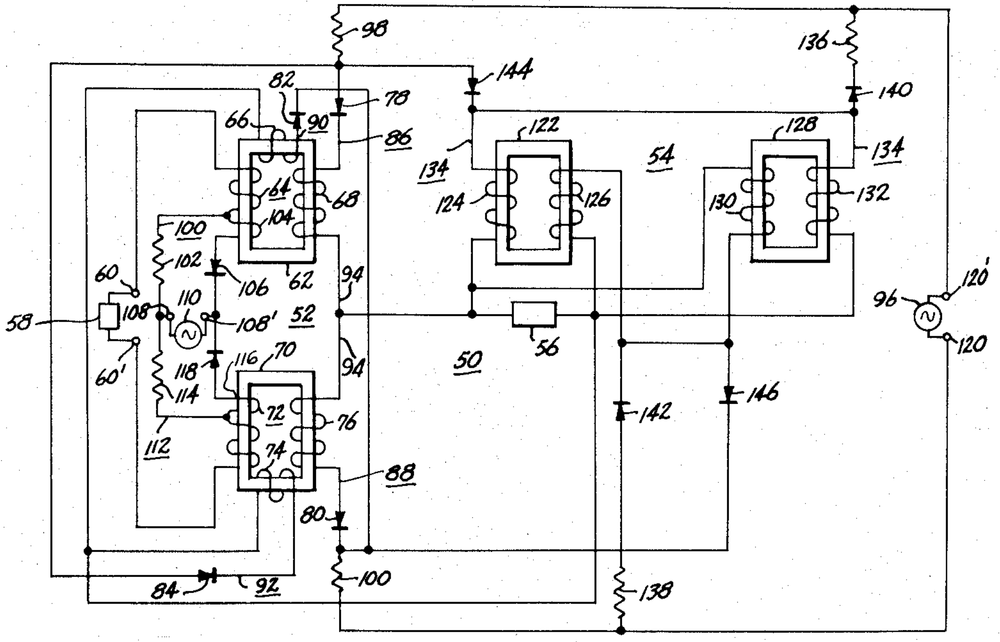
FIG. 2 is a schematic diagram of a full-wave alternating-current magnetic amplifier embodying further teachings of this invention and which is adapted to be controlled by a differential direct-current control voltage.

Referring to FIG. 2 there is illustrated a full-wave alternating-current magnetic amplifier 50 comprising two stages 52 and 54 which alternately effect a flow of current through a load 56 in accordance with the magnitude of the differential direct-current output voltage of a control source 58 which is connected to control terminals 60 and 60′.

In general, the stage 52 comprises a magnetic core member 62 having disposed in inductive relationship therewith a bias-reset winding 64 and two gate windings 66 and 68, and a magnetic core member 70 having disposed in inductive relationship therewith a bias-reset winding 72 and two gate windings 74 and 76. In practice, when the control terminal 60 is at a positive polarity with respect to the control terminal 60′, the current flow through the bias-reset winding 64 effects a flux in the magnetic core member 62 which opposes the flux produced in the magnetic core member 62 by the current flow through the gate windings 66 and 68. On the other hand, when the control terminal 60 is at a positive polarity with respect to the control terminal 60′, the control current flowing through the bias-reset winding 72 effects a flux in the magnetic core member 70 which is additive to the flux produced in the magnetic core member 70 by the current flow through the gate windings 74 and 76.

As illustrated, rectifiers 78, 80, 82 and 84 are connected in series circuit relationship with their respective gate windings 68, 76, 66, and 74, to thereby establish four series circuits 86, 88, 90 and 92. The four series circuits 86, 88, 90 and 92, are connected into a half-wave bridge circuit 94, with the load 56 connected to the output of the half-wave bridge 94 and with a source 96 of alternating-supply voltage connected to the input of the half-wave bridge 94 through current-limiting resistors 98 and 100. In operation, the current-limiting resistors 98 and 100 function to limit the flow of current through the gate windings 66, 68, 74 and 76 when the magnetic core members 62 and 70 are in the saturated state. The current-limiting resistor 98 is connected to one side of the input to the half-wave bridge 94 and the current-limiting resistor 100 is connected to the other side of the input to the half-wave bridge 94 so as to provide isolation between the stages 52 and 54.

In order to bias the magnetic core member 62 a predetermined amount away from positive saturation, a series-connected biasing-circuit 100, including a biasing resistor 102, the lower portion 104 of the bias-reset winding 64, and a rectifier 106, is connected across biasing terminals 108 and 108′ to which is connected a source 110 of alternating biasing voltage. In like manner, in order to bias the magnetic core member 70 a like amount away from positive saturation, a series-connected biasing circuit 112, including a biasing resistor 114, a lower portion 116 of the bias-reset winding 72, and a rectifier 118, is connected across the biasing terminals 108 and 108′. In operation, the supply source 96 and the biasing source 110 are so synchronized that when the biasing terminal 108 is at a positive polarity with respect to the biasing terminal 108′, the supply terminal 120 is at a positive polarity with respect to the supply terminal 120′.

For the purpose of effecting a resetting of the magnetic core members 62 and 70 in accordance with the magnitude of the output control voltage of the control source 58, the bias-reset windings 64 and 72 and the rectifiers 106 and 118 are connected in series circuit relationship with one another, the series circuit being connected across the control terminals 60 and 60′.

In general, the stage 54 includes a magnetic core member 122 having two control windings 124 and 126 disposed in inductive relationship therewith, and a magnetic core member 128 having two control windings 130 and 132 disposed in inductive relationship therewith, the control windings 124, 126, 130 and 132 being connected into another half-wave bridge circuit 134. As shown, the load 56 is connected across the output of the half-wave bridge circuit 134 and the supply source 96 is connected to the input of the bridge 134 through current-limiting resistors 136 and 138 and through rectifiers 140 and 142. In operation, the current-limiting resistors 136 and 138 function to limit the flow of current through the control windings 124, 126, 130 and 132 when the magnetic core members 122 and 128 are in the saturated state. The current-limiting resistor 136 is connected on one side of the input to the bridge 134 and the current-limiting resistor 138 is connected on the other side of the input to the bridge 134 in order to provide isolation between the stages 52 and 54. In operation, the rectifiers 140 and 142 function to prevent the flow of current through the control windings 124, 126, 130 and 132 when the supply terminal 120′ is at a positive polarity with respect to the supply terminal 120. In other words, the rectifiers 140 and 142 prevent gating of the magnetic core members 122 and 128 during the half-cycle of operation that the magnetic core members 62 and 70 are being gated.

In accordance with this invention, a series circuit including the control winding 124, of the second stage 54, and a rectifier 144, is connected in parallel circuit relationship with the series circuit including the rectifier 78 and the gate winding 68, of the stage 52, so that the magnetic core member 122 is reset, when the supply terminal 120′ is at a positive polarity with respect to the supply terminal 120, in accordance with the amount that the magnetic core member 62, of the stage 52, is reset during the previous half-cycle of operation. In like manner, in order to reset the magnetic core member 128, when the supply terminal 120′ is at a positive polarity with respect to the supply terminal 120, in accordance with the amount that the magnetic core member 70 had been reset during the previous half-cycle of operation, a series circuit including the control winding 130, of the stage 54, and a rectifier 146, is connected in parallel circuit relationship with the series circuit including the rectifier 80 and the gate winding 76, of the stage 52.

The operation of the magnetic amplifier 50 will now be described. Assuming the supply terminal 120 is at a positive polarity with respect to the supply terminal 120′, and the biasing terminal 108 is at a positive polarity with respect to the biasing terminal 108′, and that the control terminal 60 is at a positive polarity with respect to the control terminal 60′, then biasing current flows from the biasing terminal 108 through the biasing resistor 102, the portion 104, of the bias-reset winding 64, and the rectifier 106 in the forward direction, to the biasing terminal 108′, to thereby bias the magnetic core member 62 a predetermined amount. Simultaneously, bias current flows from the bias terminal 108 through the bias resistor 114, the portion 116, of the bias-reset winding 72, and the rectifier 118 in the forward direction to the bias terminal 108′, to thus bias the magnetic core member 70 a like amount. At the same time, control current flows from the control terminal 60 through the bias-reset winding 64, the rectifiers 106, and 118, and the bias-reset winding 72, to the control terminal 60′, to thus reset the magnetic core members 62 and 70 in accordance with the magnitude of the control voltage appearing across the control terminals 60 and 60'. Since the control current flowing through the bia-reset winding 64 effects a flux that opposes the flux produced by the current flowing through the associated gate windings 66 and 68, and since the control current flowing through the bias-reset winding 72 effects a flux that is additive to the flux produced by the current flowing through the associated gate windings 74 and 76, the magnetic core member 62 is reset further away from positive saturation than is the magnetic core member 70.

During the half-cycle of operation when the supply terminal 120 is at a positive polarity with respect to the supply terminal 120', magnetizing current flows from the supply terminal 120 through the current-limiting resistor 138, the rectifier 142 in the forward direction, the control windings 124, 126, 130 and 132, of the half-wave bridge 134, the rectifier 140 in the forward direction, and the current-limiting resistor 136, to the supply terminal 120'. The magnetic core member 128, of the stage 54, saturates first during this half-cycle of operation, and when it saturates load current flows from the supply terminal 120 through the current-limiting resistor 138, the rectifier 142 in the forward direction, the control winding 130, the load 56, the control winding 132, the rectifier 140 in the forward direction, and the current-limiting resistor 136, to the supply terminal 120'. Later during the same half-cycle of operation, when the supply terminal 120 is at a positive polarity with respect to the supply terminal 120', the magnetic core member 122 saturates and when this occurs, substantially no load current flows through the load 56, and current flows from the supply terminal 120 through the current-limiting resistor 138, rectifier 142, all four of the control windings 124, 126, 130 and 132, rectifier 140, and the current-limiting resistor 136, to the supply terminal 120'.

During the next half-cycle of operation, when the biasing terminal 108' is at a positive polarity with respect to the biasing terminal 108 and the supply terminal 120' is at a positive polarity with respect to the supply terminal 120, current flows from the supply terminal 120' through the current-limiting resistor 98, one side of the half-wave bridge 94 including the rectifier 78, the gate winding 68, the gate winding 76 and the rectifier 80 and through the other side of the half-wave bridge 94 including the rectifier 84, the gate winding 74, the gate winding 66 and the rectifier 82, and the current-limiting resistor 100, to the supply terminal 120. Since the magnetic core member 70 was not reset as far away from positive saturation as was the magnetic core member 62 during the previous half-cycle of operation, the magnetic core member 70 saturates first and load current flows from the supply terminal 120' through the current-limiting resistor 98, the rectifier 84 in the forward direction, the gate winding 74, the load 56, the gate winding 76, the rectifier 80 in the forward direction, and the current-limiting resistor 100, to the supply terminal 120. However, up until the time the magnetic core member 70 saturates, a reset voltage appears across the series circuit including the control winding 130 and the rectifier 146, to thereby reset the magnetic core member 128, of the stage 54, in accordance with the amount that the magnetic core member 70 had been reset during the previous half-cycle of operation.

At the same time that load current is flowing through the load 56 from right to left, as shown, magnetizing current continues to flow through the gate winding 68 and the control winding 124 until the magnetic core member 62 saturates, at which time the current no longer flows through the load 56 but rather flows through both sides of the half-wave bridge 94 including the gate windings 66, 68, 74 and 76. However, up until the time the magnetic core member 62 saturates, the magnetic core member 122 is being continuously reset in accordance with the amount that the magnetic core member 62 had been reset during the previous half-cycle of operation. Thus, during the half-cycle of operation when the supply terminal 120' is at a positive polarity with respect to the supply terminal 120 and neither of the magnetic core members 62 and 70 have been gated, no voltage appears across the load 56. When the magnetic core member 70 saturates, a voltage appears across the load 56 and then when the magnetic core member 62 saturates, substantially no voltage appears across the load 56. Thus, a full-wave alternating voltage is effected across the load 56. When the supply terminal 120 again becomes positive with respect to the supply terminal 120', the above described operation is repeated.

When the polarity of the differential control voltage appearing across the control terminals 60 and 60' reverses, there is a 180 degree phase shift in the voltage appearing across the load 56. In particular, when the control terminal 60' is at a positive polarity with respect to the control terminal 60, the current flow through the bias-reset winding 72 is additive to the biasing current flowing therethrough and the control current flowing through the bias-reset winding 64 is subtractive from the bias current flowing therethrough and therefore the magnetic core member 70 is reset further away from positive saturation than is the magnetic core member 62. Thus, during this same half-cycle of operation when current flows from the supply terminal 120, through the current-limiting resistor 138, the rectifier 142 in the forward direction, both sides of the half-wave bridge 134, the rectifier 140 in the forward direction, and the current-limiting resistor 136, to the supply terminal 120', the magnetic core member 122 saturates first and then load current flows from the supply terminal 120 through the current-limiting resistor 138, the rectifier 142 in the forward direction, the control winding 126, the load 56, the control winding 124, the rectifier 140 in the forward direction, and the current-limiting resistor 136, to the supply terminal 120'. Finally, during the same half-cycle of operation, the magnetic core member 128 saturates and then substantially no voltage appears across the load 56.

During the next half-cycle of operation, when the supply terminal 120' is at a positive polarity with respect to the supply terminal 120, current flows from the supply terminal 120' through the current-limiting resistor 98, both branches of the half-wave bridge 94, and the current-limiting resistor 100, to the supply terminal 120. Under the latter assumed conditions the magnetic core member 62 saturates before the magnetic core member 70 and when this occurs, load current flows from the supply terminal 120' through the current-limiting resistor 98, the rectifier 78 in the forward direction, the gate winding 68, the load 56, the gate winding 66, the rectifier 82 in the forward direction, and the current-limiting resistor 100, to the supply terminal 120. However, up until the time the magnetic core member 62 saturates, magnetizing current flows from the supply terminal 120' through the series circuit including the rectifier 144 and the control winding 124, to thereby reset the magnetic core member 122 in accordance with the amount that the magnetic core member 62 had been reset during the previous half-cycle of operation.

Current continues to flow from left to right through the load 56 as shown, until the magnetic core member 70 saturates, at which time substantially no voltage appears across the load 56 and current flows from the supply terminal 120' through both sides of the half-wave bridge circuit 94, to the supply terminal 120. Up until the time that the magnetic core member 70 saturates, the magnetic core member 128 is being reset in accordance with the amount that the magnetic core member 70 had been reset during the previous half-cycle of operation. When the supply terminal 120 again becomes positive with respect to the supply terminal 120', the above described operation is repeated.

Figure 3:
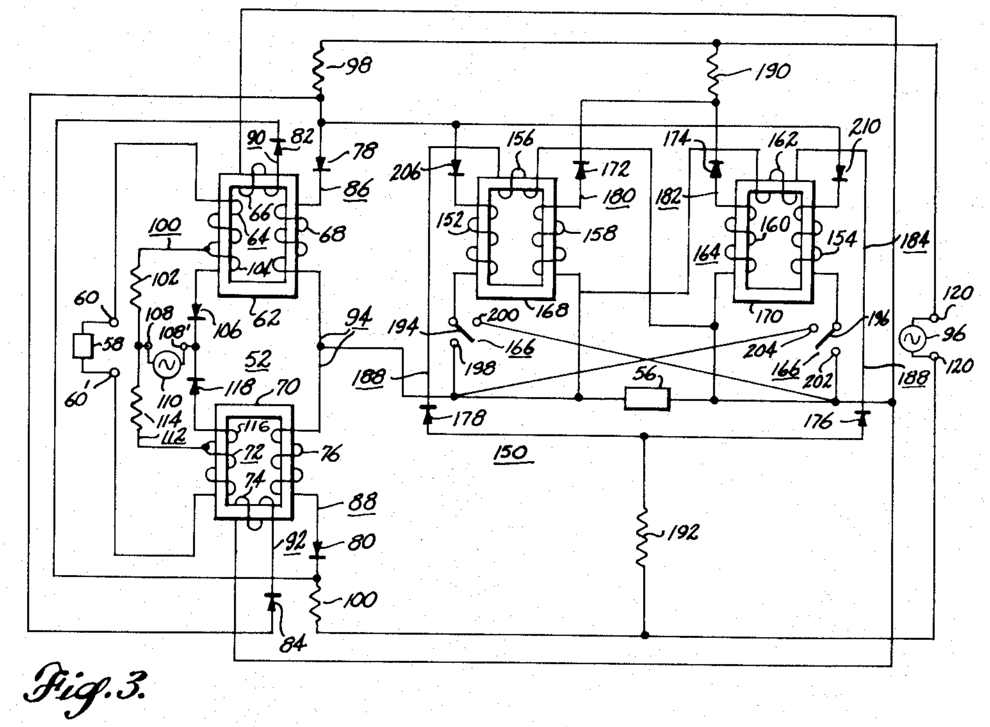
FIG. 3 is a schematic diagram of a full-wave universal magnetic amplifier embodying still further teachings of this invention and which is also adapted to be controlled by a differential direct-current control voltage.

Referring to FIG. 3 there is shown a universal full-wave magnetic amplifier 150 illustrating further teachings of this invention in which like components of FIGS. 2 and 3 have been given the same reference characters. The magnetic amplifier 150 of FIG. 3 is similar to the magnetic amplifier 50 of FIG. 2 except that separate reset windings 152 and 154 and separate gate windings 156, 158, 160 and 162 are provided for the second stage 164 of the magnetic amplifier 150. In addition, switching means 166 is provided for effecting either direct-current voltage or an alternating voltage across the load 56.

The reset winding 152 and the gate windings 156 and 158 are so disposed in inductive relationship with a magnetic core member 168 that current flowing through the reset winding 152 effects a flux in the magnetic core member 168 that opposes the flux produced by the current flowing through the gate windings 156 and 158. In like manner, the reset winding 154 and the gate windings 160 and 162 are so disposed in inductive relationship with a magnetic core member 170 that current flowing through the reset winding 154 effects a flux in the magnetic core member 170 that opposes the flux produced by the current flowing through the gate windings 160 and 162.

Rectifiers 172, 174, 176 and 178 are connected in series circuit relationship with their respective gate windings 158, 154, 162 and 156, to thus establish four series circuits 180, 182, 184 and 186. The four series circuits 180, 182, 184 and 186 comprise the four legs of a half-wave bridge 188 with the supply source 96 connected to the input of the bridge 188 through current-limiting resistors 190 and 192 and with the load 56 connected across the output of the bridge 188. In operation, the current-limiting resistors 190 and 192 provide isolation between the stages 52 and 164 and limit the flow of current through all of the gate windings 154, 156, 158 and 162 when both the magnetic core members 168 and 170 are in the saturated state.

In this instance, the switching means 166 includes movable contact members 194 and 196 which are disposed to be actuated into engagement with their respective stationary contact members 198 and 200, and 202 and 204. When the movable contact member 194 is in the circuit closed position with respect to the stationary contact member 198 and the movable contact member 196 is in the circuit closed position with respect to the stationary contact member 202, a series circuit including a rectifier 206 and the reset winding 152 is connected in parallel circuit relationship with the series circuit 86 including the rectifier 78 and the gate winding 68, and a series circuit including the reset winding 160 and a rectifier 210, is connected in parallel circuit relationship with the series circuit 92 including the rectifier 84 and the gate winding 74, to thus effect a resetting of the magnetic core member 168 in accordance with the amount that the magnetic core member 62 has been reset during the previous half-cycle of operation and to effect a resetting of the magnetic core member 170 in accordance with the amount that the magnetic core member 70 had been reset during the same previous half-cycle of operation. Also, when the movable contact members 194 and 196 are in the circuit closed position with respect to their respective stationary contact members 198 and 202, an alternating voltage is produced across the load 56.

On the other hand, when the stationary contact member 194 is in the circuit closed position with respect to its stationary contact member 200 and the movable contact member 196 is disposed in the circuit closed position with respect to its stationary contact member 204, the series circuit including the rectifier 206 and the reset winding 152 is connected in parallel circuit relationship with the series circuit 92 including the rectifier 84 and the gate winding 74; and the series circuit including the rectifier 210 and the reset winding 160 is connected in parallel circuit relationship with the series circuit 86 including the rectifier 78 and the gate winding 68, to thereby effect a resetting of the magnetic core member 168 in accordance with the amount that the magnetic core member 70 had been reset during the previous half-cycle of operation, and to effect a resetting of the magnetic core member 170 in accordance with the amount that the magnetic core member 62 had been reset during the same previous half-cycle of operation. With the movable contact members 194 and 196 disposed in circuit closed position with respect to their respective stationary contact members 200 and 204, a direct-current voltage is effected across the load 56.

The operation of the magnetic amplifier 150 of FIG. 3 will now be described. Assuming the control terminal 60 is at a positive polarity with respect to the control terminal 60′ and that the supply terminal 120 is at a positive polarity with respect to the supply terminal 120′, the biasing source 110 effects a biasing of the magnetic core members 62 and 70 in the same manner as previously described with reference to the magnetic amplifier 50 of FIG. 2; and the control source 58 effects a resetting of the flux level in the magnetic core members 62 and 70 in the same fashion as previously described with reference to the magnetic amplifier 50, to thereby reset the magnetic core member 62 further away from positive saturation than the magnetic core member 70. Assuming the movable contact members 194 and 196 are disposed in the circuit closed position with respect to their respective stationary contact members 198 and 202, then during the same half-cycle of operation, when the supply terminal 120 is at a positive polarity with respect to the supply terminal 120′, current flows from the supply terminal 120 through the current-limiting resistor 192, both sides of the half-wave bridge circuit 188, and the current-limiting resistor 190, to the supply terminal 120′. During this half-cycle of operation, the magnetic core member 170 saturates before the magnetic core member 168 and when the magnetic core member 170 saturates, load current flows from the supply terminal 120 through the current-limiting resistor 192, the rectifier 176 in the forward direction, the gate winding 162, the load 56, the gate winding 154, the rectifier 174 in the forward direction, and the current-limiting resistor 190, to the supply terminal 120′. The magnetic core member 168 saturates after the magnetic core member 170 but during the same half-cycle of operation and when the magnetic core member 168 saturates, substantially no voltage appears across the load 56 and current flows through both sides of the half-wave bridge 188 to bypass the load 56.

During the next half-cycle of operation when the supply terminal 120′ is at a positive polarity with respect to the supply terminal 120, current flows from the supply terminal 120′ through the current-limiting resistor 98 and both sides of the half-wave bridge 94 and the current-limiting resistor 100, to the supply terminal 120. Since during the previous half-cycle of operation, the magnetic core member 70 was not reset as far below positive saturation as was the magnetic core member 62, the magnetic core member 70 saturates before the magnetic core member 62 and at this time load current flows from the supply terminal 120′ through the current-limiting resistor 98, the rectifier 84 in the forward direction, the gate winding 74, the load 56, the gate winding 76, the rectifier 80 in the forward direction, and the current-limiting resistor 100, to the supply terminal 120. During the same half-cycle of operation, but later in the half-cycle of operation the magnetic core member 62 saturates and at this time substantially no voltage appears across the load 56, and current flows through both sides of the half-wave bridge 94, to thus bypass the load 56.

When the supply terminal 120′ is at a positive polarity with respect to the supply terminal 120, the reset winding 152 of the magnetic core member 168 has a voltage across it that is proportional to the voltage across the gate winding 68, and thus the magnetic core member 168 is reset in accordance with the amount that the magnetic core member 62 had been reset during the previous half-cycle of operation. During this same half-cycle of operation, when the supply terminal 120' is at a positive polarity with respect to the supply terminal 120, the reset winding 160 has a voltage thereacross that is proportional to the voltage across the gate winding 76, of the magnetic core member 70, and thus the magnetic core member 170 is reset during this half-cycle of operation an amount proportional to the amount that the magnetic core member 70 had been reset during the previous half-cycle of operation.

Assuming the polarity of the output voltage of the control source 58 is reversed so that the control terminal 60' is at a positive polarity with respect to the control terminal 60 and assuming that the stationary contact members 194 and 196 remain in the circuit closed position with respect to the stationary contact members 198 and 202, respectively, the alternating voltage across the load 56 shifts 180 degrees in phase. Specifically, under these latter assumed conditions the magnetic core member 62 saturates before the magnetic core member 70 when the supply terminal 120' is at a positive polarity with respect to the supply terminal 120. Therefore, when the supply terminal 120 is at a positive polarity with respect to the supply terminal 120', the magnetic core member 168, of the stage 164, saturates before the other magnetic core member 170 of this stage. Otherwise, the operation of the magnetic amplifier 150 under the latter assumed conditions is similar to the operation when the control terminal 60 was at a positive polarity with respect to the control terminal 60', and thus a further description of such operation is deemed unnecessary.

When the movable contact members 194 and 196 are actuated into the circuit closed position with respect to their respective stationary contact members 200 and 204, a direct-current voltage is produced across the load 56. In particular, assuming the control terminal 60 is at a positive polarity with respect to the control terminal 60', and assuming the supply terminal 120' is at a positive polarity with respect to the supply terminal 120, the operation of the magnetic amplifier 150 under these assumed conditions is substantially the same for this half-cycle of operation as that previously described for the condition where the stationary contact members 194 and 196 were in the circuit closed position with respect to their associated stationary contacts 198 and 202 and the control terminal 60 was also at a positive polarity with respect to the control terminal 60'. One difference is that under the latter assumed conditions the series circuit including the reset winding 160, of the stage 164, and the rectifier 210 is now connected in parallel circuit relationship with the series circuit 86, including the gate winding 68, of the stage 52, and the rectifier 78. In addition, the series circuit including the reset winding 152, of the stage 164, and the rectifier 206 is now, under these latter assumed conditions, connected in parallel circuit relationship with the series circuit 92 including the rectifier 84 and the gate winding 74, of the stage 52. Therefore, the magnetic core member 170, of the stage 164, is reset during this half-cycle of operation, when the supply terminal 120' is at a positive polarity with respect to the supply terminal 120, an amount proportional to the amount that the magnetic core member 62 had been reset during the previous half-cycle of operation. On the other hand, the magnetic core member 168, of the stage 164, is reset an amount proportional to the amount that the magnetic core member 70 had been reset during the same previous half-cycle of operation.

During the next half-cycle of operation, when the supply terminal 120 is at a positive polarity with respect to the supply terminal 120', the magnetic core members 62 and 70, of the stage 52, are biased and reset in the same manner as was previously described for the condition when the movable contact members 194 and 196 were disposed in the circuit closed position with respect to the stationary contact members 198 and 202, respectively, and the control terminal 60 was at a positive polarity with respect to the control terminal 60'. However, owing to the changed position of the switching means 166 under the latter assumed conditions, when the supply terminal 120 is at a positive polarity with respect to the supply terminal 120', the magnetic core member 168, of the stage 164, saturates before the magnetic core member 170 of this same stage. Therefore, load current flows from the supply terminal 120 through the current-limiting resistor 192, the rectifier 178 in the forward direction, the gate winding 156, the load 56, the gate winding 158, the rectifier 172 in the forward direction, and the current-limiting resistor 190, to the supply terminal 120', to thereby effect a direct-current voltage across the load 56.

Assuming the movable contact members 194 and 196 are still in the circuit closed position with respect to their associated stationary contact members 200 and 204, respectively, and assuming the polarity of the voltage across the control source 58 reverses so that the control terminal 60' is at a positive polarity with respect to the control terminal 60, then the polarity of the voltage across the load 56 reverses so that the left end of the load 56, as shown, is at a positive polarity with respect to its right end, as shown. In particular, when the supply terminal 120 is at a positive polarity with respect to the supply terminal 120', the magnetic core members 62 and 70, of the stage 52, are biased or reset in the same manner as previously described for the condition when the movable contact members 194 and 196 were disposed in the circuit closed position with respect to their associated stationary contact members 198 and 202 and the control terminal 60' was at a positive polarity with respect to the control terminal 60. During this same half-cycle of operation, load current flows from the supply terminal 120 through the current-limiting resistor 192, the rectifier 176, in the forward direction, the gate winding 162, of the magnetic core member 170, the load 56, the gate winding 154, of the magnetic core member 170', the rectifier 174 in the forward direction, and the current-limiting resistor 190, to the supply terminal 120'.

During the next half-cycle of operation, when the supply terminal 120' is at a positive polarity with respect to the supply terminal 120, load current flows from the supply terminal 120' through the current-limiting resistor 98, the rectifier 78 in the forward direction, the gate winding 68, of the magnetic core member 62, the load 56, the gate winding 66, of the magnetic core member 62, the rectifier 82 in the forward direction, and the current-limiting resistor 100, to the supply terminal 120.

Figure 4:
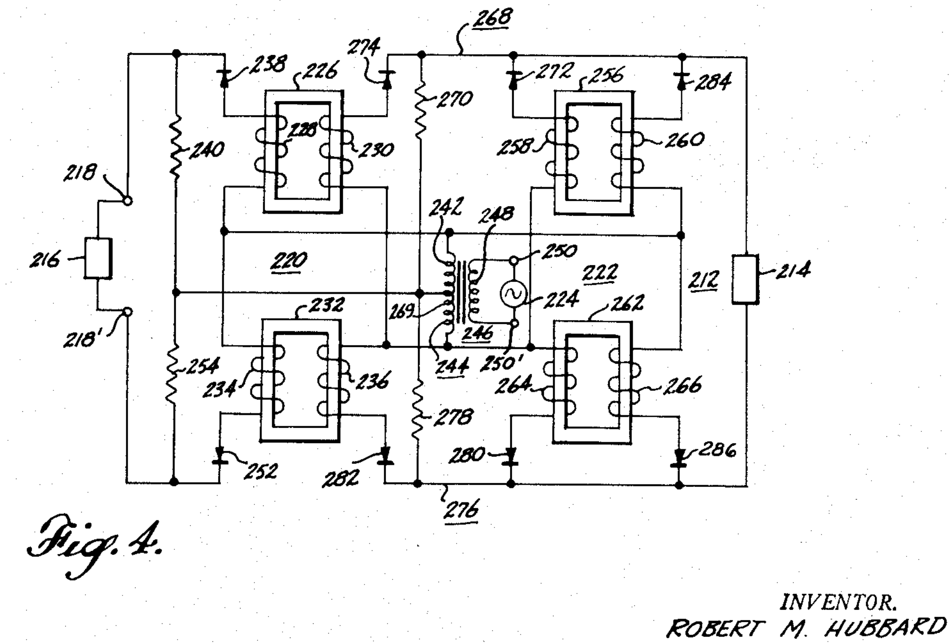
FIG. 4 is a schematic diagram of a magnetic amplifier embodying still other teachings of this invention which a full-wave output is effected by half-wave circuitry.

Referring to FIG. 4 there is illustrated a full-wave magnetic amplifier 212 for effecting a reversible direct-current voltage across a load 214 in accordance with the polarity of the direct-current output voltage of a control source 216 which is connected to control terminals 218 and 218'. As will be realized hereinafter, the magnetic amplifier 212 comprises half-wave circuitry.

In general, the magnetic amplifier 212 comprises two stages 220 and 222 which on alternate half-cycles of the output of an alternating-supply source 224 effect a direct-current voltage across the load 214. In this instance, the stage 220 comprises a magnetic core member 226 which has disposed in inductive relationship therewith a bias-reset winding 228 and a gate winding 230, and a magnetic core member 232 which has disposed in inductive relationship therewith a bias-reset winding 234 and a gate winding 236. In operation, the bias current flowing through the bias-reset windings 228 and 234 effects a flux in the respective magnetic core members 226 and 232 which opposes the flux produced in these magnetic core members by the current flowing through their respective gate windings 230 and 236.

In order to effect a biasing of the magnetic core member 226, a series circuit including the bias-reset winding 228, a rectifier 238, and a bias resistor 240, is connected across the upper portion 242 of the secondary winding 244, of a potential transformer 246, whose primary winding 248 is connected to supply terminals 250 and 250′ which in turn are connected to the supply source 224. On the other hand, biasing of the magnetic core members 232 is effected by connecting a series circuit including the bias-reset winding 234, a rectifier 252 and a bias resistor 254 across the upper portion 242 of the secondary winding 244. As shown, the rectifiers 238 and 252 are so poled as to permit the flow of bias current through the bias-reset windings 228 and 234 only when the upper end of the portion 242, of the secondary winding 244, is at a positive polarity with respect to the lower end of the portion 242, as shown.

The stage 222 includes a magnetic core member 256 having disposed in inductive relationship therewith a reset winding 258 and a gate winding 260, and a magnetic core member 262 having disposed in inductive relationship therewith a reset winding 264 and a gate winding 266. The reset windings 258 and 264 are so wound on their respective magnetic core members 256 and 262 that current flowing therethrough effects a flux in the respective magnetic core members 256 and 262 which opposes the flux produced by the current flowing through the respective gate windings 260 and 266.

In accordance with the teachings of this invention, a parallel circuit 268 and a dummy load or current-limiting resistor 270 is connected in series circuit relationship with respect to the lower portion 269, of the secondary winding 244. As shown, one branch of the parallel circuit 268 includes the reset winding 258 and a rectifier 272 and the other branch of the parallel circuit 268 includes the gate winding 230 and a rectifier 274. Thus, in operation, the magnetic core member 256 is reset an amount proportional to the amount that the magnetic core member 226 had been reset during the previous half-cycle of operation. The rectifiers 272 and 274 are so poled as to permit, only when the lower end of the secondary winding 244, as shown, is at a positive polarity with respect to its upper end, as shown, the flow of current from the secondary winding 244, of the transformer 246, through the parallel circuit 268 and the current-limiting resistor 270.

Also in accordance with the teachings of this invention, a series circuit including a parallel circuit 276 and a dummy load or current-limiting resistor 278 is connected in series circuit relationship with respect to the lower portion 269, of the secondary winding 244. One branch of the parallel circuit 276 includes the gate winding 236, and rectifier 282, and the other branch of the parallel circuit 276 includes a rectifier 280 and the reset winding 264. Thus, in operation, the magnetic core member 262 is reset an amount proportional to the amount that the magnetic core member 232 is reset during the previous half-cycle of operation. In this instance, the rectifiers 280 and 282 are so poled as to permit, only when the lower end of the secondary winding 244, as shown, is at a positive polarity with respect to its upper end, as shown, the flow of current through the parallel circuit 276.

In order to effect a gating of the magnetic core member 256, only when the upper end of the secondary winding 244, as shown, is at a positive polarity with respect to its lower end, as shown, the gate winding 260 and a rectifier 284 are connected in series circuit relationship with respect to the current-limiting resistor 270, the latter mentioned series circuit being connected across the upper portion 242, of the secondary winding 244. In like manner, in order to effect a gating of the magnetic core member 262, only when the upper end of the secondary winding 244, as shown, is at a positive polarity with respect to its lower end, as shown, the gate winding 266 and a rectifier 286 are connected in series circuit relationship with respect to the current-limiting resistor 278, the latter mentioned series circuit also being connected across the upper portion 242, of the secondary winding 244.

The operation of the magnetic amplifier 212 will now be described. Assuming the polarity of the output voltage of the control source 216 is such that the control terminal 218 is at a positive polarity with respect to the control terminal 218′ and assuming further that the upper end of the secondary winding 244, as shown, is at a positive polarity with respect to its lower end, as shown, then biasing current flows from the upper end of the secondary winding 244 through the bias-reset winding 228, the rectifier 238 in the forward direction, and the bias resistor 240, to the lower end of the upper portion 242, of the secondary winding 244, as shown, to thereby bias the magnetic core member 226. Simultaneously, biasing current flows from the upper end of the secondary winding 244, as shown, through the bias-reset winding 234, the rectifier 252 in the forward direction, and the bias resistor 254, to the lower end of the upper portion 242, of the secondary winding 244, as shown, to thus bias the magnetic core member 232, a like amount. At the same time, control current flows from the control terminal 218 through the rectifier 238, the bias-reset windings 228 and 234, and the rectifier 252, to the control terminal 218′, to thus reset the magnetic core members 226 and 232. Since the control current flowing through the bias-reset winding 228 opposes the bias current flowing therethrough, and is additive to the bias current flowing through the bias-reset winding 234, the magnetic core member 226 is not reset as far away from positive saturation as is the magnetic core member 232.

During this same half-cycle of operation, when the upper end of the secondary winding 244, as shown, is at a positive polarity with respect to its lower end, as shown, magnetizing current flows from the upper end of the secondary winding 244, as shown, through the gate winding 260, of the magnetic core member 256, the rectifier 284 in the forward direction, and the current-limiting resistor 270, to the lower end of the upper portion 242, of the secondary winding 244, as shown. At the same time, magnetizing current flows from the upper end of the secondary winding 244, as shown, through the gate winding 266, of the magnetic core member 262, the rectifier 286 in the forward direction, and the current-limiting resistor 278, to the lower end of the upper portion 242, of the secondary winding 244, as shown. Until the magnetic core members 256 and 262 saturate, the voltages across the current-limiting resistors 270 and 278 are substantially equal and in opposition, and therefore substantially no voltage appears across the load 214. However, when the magnetic core member 256 saturates, load current flows from the upper end of the secondary winding 244, as shown, through the gate winding 260, the rectifier 284 in the forward direction, and the current-limiting resistor 270, to the lower end of the upper portion 242, of the secondary winding 244, to thereby render the upper end of the current-limiting resistor 270, as shown, at a positive polarity with respect to the lower end of the current-limiting resistor 278, as shown. Thus, under the assumed conditions the upper end of the load 214 is at a positive polarity with respect to its lower end during this portion of the operation. However, when the magnetic core member 262 saturates, load current also flows from the upper end of the secondary winding 244, as shown, through the gate winding 266, the rectifier 286 in the forward direction, and the current-limiting resistor 278, to the lower end of the upper portion 242, of the secondary winding 244, as shown, to thereby render the voltages across the current-limiting resistors 270 and 278 substantially equal and thus reduce the voltage across the load 214 to substantially zero value.

During the next half-cycle of operation when the lower end of the secondary winding 244, as shown, is at a positive polarity with respect to its upper end, as shown, current flows from the lower end of the secondary winding 244, as shown, through both branches of the parallel circuit 268 and the current-limiting resistor 270, to the lower end of the upper portion 242, of the secondary winding 244, as shown, to thereby gate the magnetic core member 226 and reset the magnetic core member 256, an amount proportional to the amount that the magnetic core member 226 had been reset during the previous half-cycle of operation. Simultaneously, current flows from the lower end of the secondary winding 244, as shown, through both branches of the parallel circuit 276, and the current-limiting resistor 278 to the lower end of the upper portion 242, of the secondary winding 244, as shown, to thereby gate the magnetic core member 232 and reset the magnetic core member 262 an amount proportional to the amount that the magnetic core member 232 had been reset during the same previous half-cycle of operation. Until the magnetic core members 226 and 232 saturate, the voltages across the current-limiting resistors 270 and 278 are substantially equal and in opposition, and therefore no voltage appears across the load 214. However, when the magnetic core member 226 saturates, load current flows from the lower end of the secondary winding 244, as shown, through the gate winding 230, the rectifier 274 in the forward direction, and the current-limiting resistor 270, to the lower end of the upper portion 242, of the secondary winding 244, as shown, to thereby render the upper end of the current-limiting resistor 270 positive with respect to the lower end of the current-limiting resistor 278, as shown. This in turn renders the upper end of the load 214 positive with respect to its lower end, as shown. This voltage appears across the load 214 until the magnetic core member 232 saturates at which time load current flows from the lower end of the secondary winding 244, as shown, through the gate winding 236, the rectifier 282 in the forward direction, and the current-limiting resistor 278, to the lower end of the upper portion 242, of the secondary winding 244, as shown, to thereby render the voltage across the current-limiting resistor 278 substantially equal to the voltage appearing across the current-limiting resistor 270, thereby reducing the voltage across the load 214 to substantially zero value. When the upper end of the secondary winding 244, as shown, again becomes positive with respect to its lower end, as shown, the above described cycle of operation is repeated.

Assuming the polarity of the control voltage is reversed so that the control terminal 218' is at a positive polarity with respect to the control terminal 218, and assuming further that the upper end of the secondary winding 244, as shown, is at a positive polarity with respect to the lower end, as shown, then the magnetic core members 226 and 232 are biased as previously described. However, the control current flowing from the control terminal 218' through the rectifier 252, the bias-reset windings 234 and 228, and the rectifier 238, to the control terminal 218 opposes the bias current flowing through the bias-reset winding 234 and adds to the bias current flowing through the bias-reset winding 228, to thus reset the magnetic core member 226 further away from positive saturation than is the magnetic core member 232.

During this same half-cycle of operation, magnetizing current flows from the upper end of the secondary winding 244, as shown, through the gate winding 260, of the magnetic core member 256, the rectifier 284 in the forward direction, and the current-limiting resistor 270, to the lower end of the upper portion 242, of the secondary winding 244, as shown. Simultaneously, magnetizing current flows from the upper end of the secondary winding 244, as shown, through the gate winding 266, of the magnetic core member 262, the rectifier 286 in the forward direction, and the current-limiting resistor 278 to the lower end of the upper portion 242, of the secondary winding 244, as shown. Until the magnetic core members 256 and 262 saturate, the voltage across the current-limiting resistors 270 and 278 are substantially equal and in opposition, and therefore no voltage appears across the load 214. However, when the magnetic core member 262 saturates, load current flows from the upper end of the secondary winding 244, as shown, through the gate winding 266, the rectifier 286 in the forward direction and the current-limiting resistor 278, to the lower end of the upper portion 242, of the secondary winding 244, as shown, to thereby render the lower end of the current-limiting resistor 278, as shown, positive with respect to the upper end of the current-limiting resistor 270, as shown. Such being the case the lower end of the load 214, as shown, becomes positive with respect to its upper end, as shown. Then when the magnetic core member 256 saturates, load current flows from the upper end of the secondary winding 244, as shown, through the gate winding 260, of the magnetic core member 256, the rectifier 284 in the forward direction, and the current-limiting resistor 270, to the lower end of the upper portion 242, of the secondary winding 244, as shown, to thereby render the magnitude of the voltages across the current-limiting resistors 270 and 278 substantially equal, thereby reducing the voltage across the load 214 to zero value.

During the next half-cycle of operation, when the lower end of the secondary winding 244 is at a positive polarity with respect to its upper end, as shown, current flows from the lower end of the secondary winding 244, as shown, through both branches of the parallel circuit 268, and the current-limiting resistor 270, to the lower end of the upper portion 242, of the secondary winding 244, as shown, to thereby gate the magnetic core member 226 and reset the magnetic core member 256. Simultaneously, current flows from the lower end of the secondary winding 244, as shown, through both branches of the parallel circuit 276 and the current-limiting resistor 278, to the lower end of the upper portion 242, of the secondary winding 244, as shown, to thereby gate the magnetic core member 232 and reset the magnetic core member 262. Before either of the magnetic core members 226 and 232 become saturated, the voltages across the current-limiting resistors 270 and 278 are substantially equal and in opposition, and therefore substantially no voltage appears across the load 214. However, when the magnetic core member 232 saturates, load current flows from the lower end of the secondary winding 244, as shown, through the gate winding 236, the rectifier 282 in the forward direction, and the current-limiting resistor 278, to the lower end of the upper portion 242, of the secondary winding 244, as shown, to thus render the lower end of the load 214, as shown, positive with respect to its upper end, as shown. Then, when the magnetic core member 226 saturates, load current flows from the lower end of the secondary winding 244, as shown, through the gate winding 230, of the magnetic core member 226, the rectifier 274 in the forward direction, and the current-limiting resistor 270 to the lower end of the upper portion 242, of the secondary winding 244, as shown, to thereby render the voltages across the current-limiting resistors 270 and 278 substantially equal and thus reduce the voltage across the load 214 to substantially zero value. When the upper end of the secondary winding 244, as shown, again becomes positive with respect to its lower end, the above described cycle of operation is repeated.

It is to be understood that the reversible polarity direct-current control sources 58 and 216, shown in FIGS. 2 through 4, can be replaced by a reversible-phase alternating control sources (not shown) synchronized with and of the same frequency as the supply sources associated with the particular magnetic amplifier circuits. It is also to be understood that an alternating control source (not shown) could be substituted for the direct-current control source 14 provided the polarity of the output of the alternating control source (not shown) is the same as that of the direct-current control 14 source during the reset half-cycle of operation when the magnetic core member 22 is being reset.

Since numerous changes may be made in the above apparatus and circuits and different embodiments may be made without departing from the spirit and scope thereof, it is intended that all matter contained in the foregoing description or shown in the accompanying drawings shall be interpreted as illustrative and not in a limiting sense.

I claim as my invention:

1. In a two-stage magnetic amplifier adapted to be connected to a source of alternating voltage to effect a voltage across a load, the combination comprising, a first magnetic amplifier stage including a magnetic core member having a gate winding disposed in inductive relationship therewith, circuit means for connecting said load and said gate winding in circuit relationship with said source so that during alternate half-cycles of the output of said source said magnetic core member is gated and said first stage effects a flow of current through said load, means for resetting the flux level in said magnetic core member in accordance with a control signal during the other alternate half-cycles of the output of said source, a second magnetic amplifier stage including a magnetic core member having a reset winding disposed in inductive relationship therewith, other circuit means interconnected with said load and with said source for effecting a gating of the magnetic core member of said second stage during said other alternate half-cycles of the output of said source so that said second stage effects a flow of current through said load during this portion of the operation, and further circuit means for so interconnecting said gate winding and said winding of said second magnetic amplifier stage in parallel circuit relationship with respect to one another that the magnetic core member of said second stage is reset during the same alternate half-cycles, of the output of said source, that the magnetic core member of said first stage is gated and the amount of reset being in accordance with the gating effected by said gate winding.

2. In a two-stage magnetic amplifier adapted to be connected to a source of alternating voltage to effect a voltage across a load, the combination comprising, a first magnetic amplifier stage including a magnetic core member having a gate winding disposed in inductive relationship therewith, and means for resetting the flux level in the magnetic core member in accordance with a control signal, a second magnetic amplifier stage including a magnetic core member having a reset winding disposed in inductive relationship therewith and circuit means interconnected with said source, with said winding of said second magnetic amplifier stage, and with said load for effecting a gating of the magnetic core member of said second stage, circuit means for connecting said load and a parallel circuit in series circuit relationship with respect to said source, one branch of the parallel circuit including said gate winding and the other branch of the parallel circuit including said winding of said second magnetic amplifier stage, so that, during one half-cycle of the output of said source, the magnetic core member of said first stage is gated and the magnetic core member of said second stage is reset, said first stage effecting a flow of current through said load during this portion of the operation, and so that, during the next half-cycle of the output of said source, the magnetic core member of said second stage is gated and the magnetic core member of said first stage is reset, said second stage effecting a flow of current through said load during this latter portion of the operation.

3. In a two-stage magnetic amplifier adapted to be connected to a source of alternating voltage to effect a voltage across a load, the combination comprising, a first magnetic amplifier stage including a magnetic core member having a gate winding disposed in inductive relationship therewith, a second magnetic amplifier stage including a magnetic core member having a reset winding and a gate winding disposed in inductive relationship therewith, circuit means for connecting said load and a parallel circuit in series circuit relationship with respect to said source, one branch of the parallel circuit including a first rectifier and the gate winding of said first stage and the other branch of the parallel circuit including a second rectifier and said reset winding, said rectifiers being so poled as to permit, only during alternate half-cycles of the output of said source, the flow of current from said source through both the gate winding of said first stage and said reset winding so that said first stage effects a flow of current through said load during said alternate half-cycles of the output of said source, means for resetting the flux level in the magnetic core member of said first stage in accordance with a control signal during the other alternate half-cycles of the output of said source, and other circuit means for so interconnecting the gate winding of said second stage with said load that the magnetic core member of said second stage is gated and said second stage effects a flow of current through said load only during said other alternate half-cycles of the output of said source.

4. In a two-stage magnetic amplifier adapted to be connected to a source of alternating voltage to effect a voltage across a load, the combination comprising, a first magnetic amplifier stage including a magnetic core member having a gate winding disposed in inductive relationship therewith, a second magnetic amplifier stage including a magnetic core member having a winding disposed in inductive relationship therewith, circuit means for connecting said load and a parallel circuit in series circuit relationship with respect to said source, one branch of the parallel circuit including a first rectifier and said gate winding and the other branch of the parallel circuit including a second rectifier and the winding of said second stage, said rectifiers being so poled as to permit, only during alternate half-cycles of the output of said source, the flow of current from said source in one direction through both the said gate winding and the winding of said second stage so that said first stage effects a flow of current through said load during said alternate half-cycles of the output of said source, means for resetting the flux level in the magnetic core member of said first stage in accordance with a control signal during the other alternate half-cycles of the output of said source, and further circuit means so interconnecting said source with said load and with the winding of said second stage that only during said other alternate half-cycles of the output of said source, current flows from said source through said load and through the winding of said second stage in the opposite direction, to thereby gate the magnetic core member of said second stage and permit said second stage to effect a flow of current through said load during said other alternate half-cycles of the output of said source.

5. In a two-stage magnetic amplifier adapted to be connected to a source of alternating voltage to effect a direct-current voltage across a load, the combination comprising, a first magnetic amplifier stage including a magnetic core member having a gate winding disposed in inductive relationship therewith, a first series circuit including said gate winding and a rectifier, a second magnetic amplifier stage including a magnetic core member having a winding disposed in inductive relationship therewith, a second series circuit including a rectifier and the winding of said second stage, a third and a fourth rectifier, circuit means for connecting said third and said fourth rectifier and said first and said second series circuit into a Wheatstone bridge, having an input and an output diagonal, with said first series circuit as one leg of said bridge, with said second series circuit as another leg of said bridge, with said third rectifier as still another leg of said bridge, and with said fourth rectifier as the last leg of said bridge, other circuit means for connecting said load across the output diagonal of said bridge and said source to the input diagonal of said bridge so that the magnetic core member of said first stage is gated only during alternate half-cycles of the output of said source and so that the magnetic core members of said second stage are gated only during the other alternate half-cycles of the output of said source, further circuit means, including a fifth rectifier, for connecting the winding of said second stage in parallel circuit relationship with said first series circuit so that the magnetic core member of said second stage is reset during the same alternate half-cycles, of the output of said source, that the magnetic core member of said first stage is gated, and means for resetting the flux level in the magnetic core member of said first stage during said other alternate half-cycles of the output of said source.

6. In a full-wave two-stage differential magnetic amplifier adapted to be connected to a source of alternating voltage to effect a voltage across a load, the combination comprising, a first magnetic amplifier stage including four gate windings each of which has a separate rectifier connected in series circuit relationship therewith to thus establish four series circuits, the gate windings of two of said four series circuits being disposed in inductive relationship with a first magnetic core member and the gate windings of the other two of said four series circuits being disposed in inductive relationship with a second magnetic core member, means for resetting the flux level in said first and in said second magnetic core member during alternate half-cycles of the output of said source, circuit means for connecting said four series circuits into a half-wave bridge having an input and an output, other circuit means for connecting said load to the output of said bridge and for connecting said source to the input of said bridge through current-limiting means so that load current is permitted to flow, only during the other alternate half-cycles of the output of said source, from said source through either the two gate windings of said first magnetic core member and the load in one direction or the two gate windings of said second magnetic core member and said load in the opposite direction, depending on whether said first or said second magnetic core member saturates first, a second magnetic amplifier stage including two control windings disposed in inductive relationship with a third magnetic core member and two control windings disposed in inductive relationship with a fourth magnetic core member, further circuit means for connecting said four control windings into another half-wave bridge having an input and an output, still further circuit means for connecting said load to the output of said another half-wave bridge and for connecting said source to the input of said another half-wave bridge through other current-limiting means so that load current is permitted to flow, only during said alternate half-cycles of the output of said source, from said source through either the two control windings of said third magnetic core member and said load in said opposite direction or the two control windings of said fourth magnetic core member and said load in said one direction depending on whether said third or said fourth magnetic core members saturates first, still other circuit means for connecting one of the two control windings of said third magnetic core member in parallel circuit relationship with one of said series circuits that includes one of the two gate windings of said first magnetic core member so that said third magnetic core member is reset only during said other alternate half-cycles of the output of said source, and further circuit means for connecting one of the two control windings of said fourth magnetic core member in parallel circuit relationship with one of said series circuit that includes one of the two gate windings of said second magnetic core member so that said fourth magnetic core member is reset only during said other alternate half-cycles of the output of said source.

7. In a full-wave two-stage differential magnetic amplifier adapted to be connected to a source of alternating voltage to effect a voltage across a load, the combination comprising, a first magnetic amplifier stage including four gate windings, each of which has a separate rectifier connected in series circuit relationship therewith to thus establish four series circuits, the gate windings of two of said four series circuits being disposed in inductive relationship with a first magnetic core member and the gate windings of the other two of said four series circuits being disposed in inductive relationship with a second magnetic core member, means for resetting the flux level in said first and in said second magnetic core member during alternate half-cycles of the output of said source, circuit means for connecting said four series circuits into a half-wave bridge having an input and an output, other circuit means for connecting said load to the output of said bridge, still other circuit means for connecting said source to the input of said bridge through two current limiters, one of said two current limiters being connected to one side of the input of said bridge and the other of said two current limiters being connected to the other side of the input of said bridge, so that load current is permitted to flow, only during the other alternate half-cycles of the output of said source, from said source through either the two gate windings of said first magnetic core member and the load in one direction, or the two gate windings of said second magnetic core member and said load in the opposite direction depending on whether said first or said second magnetic core member saturates first, a second magnetic amplifier stage including two control windings disposed in inductive relationship with a third magnetic core member and two control windings disposed in inductive relationship with a fourth magnetic core member, further circuit means for connecting said four control windings into another half-wave bridge having an input and an output, still further circuit means for connecting said load to the output of said another half-wave bridge, still other circuit means for connecting said source to the input of said another half-wave bridge through two other current limiters, one of said two other current limiters being connected to one side of the input of said another half-wave bridge and the other of said two other current limiters being connected to the other side of the input of said another half-wave bridge, so that load current is permitted to flow, only during said alternate half-cycles of the output of said source from said source through either the two control windings of said third magnetic core member and said load in said opposite direction or the two control windings of said four magnetic core members and said load in said one direction depending on whether said third or said fourth magnetic core member saturates first, still further circuit means for connecting one of the two control windings of said third magnetic core member in parallel circuit relationship with one of said series circuits that includes one of the two gate windings of said first magnetic core member so that said third magnetic core member is reset only during said other alternate half-cycles of the output of said source, and further circuit means for connecting one of the two control windings of said fourth magnetic core member in parallel circuit relationship with one of said series circuits that includes one of the two gate windings of said second magnetic core member so that said fourth magnetic core member is reset only during said other alternate half-cycles of the output of said source.

8. In a full-wave two-stage differential magnetic amplifier adapted to be connected to a source of alternating voltage to effect a voltage across a load, the combination comprising, a first magnetic amplifier stage including four gate windings each of which has a separate rectifier connected in series circuit relationship therewith to thus establish four series circuits, the gate windings of two of said four series circuits being disposed in inductive relatonship with a first magnetic core member and the gate windings of the other two of said four series circuits being disposed in inductive relationship with a second magnetic core member, means for resetting the flux level in said first and in said second magnetic core members during alternate half-cycles of the output of said source, circuit means for connecting said four series circuits into a first half-wave bridge having an input and an output, other circuit means for connecting said load to the output of said bridge and for connecting said source to the input of said bridge through current-limiting means so that load current is permitted to flow, only during the other alternate half-cycles of the output of said source, from said source through either the two gate windings of said first magnetic core member and said load in one direction or the two gate windings of said second magnetic core member and said load in the opposite direction depending on whether said first or said second magnetic core member saturates first, a second magnetic amplifier stage including four gate windings each of which has a separate rectifier connected in series circuit relationship therewith to thus establish another four series circuits, the gate windings of two of said another four series circuits being disposed in inductive relationship with a third magnetic core member and the gate windings of the other two of said another four series circuits being disposed in inductive relationship with a fourth magnetic core member, other circuit means for connecting said another four series circuits into a second half-wave bridge having an input and an output, still other circuit means for connecting said load to the output of said second bridge and for connecting said source to the input of said second bridge through other current-limiting means so that load current is permitted to flow, only during said alternate half-cycles of the output of said source, from said source through either the two gate windings of said third magnetic core member and said load in said opposite direction or the two gate windings of said fourth magnetic core member and said load in said one direction depending on whether said third or said fourth magnetic core member saturates first, a reset winding disposed in inductive relationship with said third magnetic core member and a reset winding disposed in inductive relationship with said fourth magnetic core member, a rectifier connected in series circuit relationship with the reset winding of said third magnetic core member, still further circuit means for connecting the series circuit including the reset winding of said third magnetic core member in parallel circuit relationship with one of said series circuits that includes one of the two gate windings of said first magnetic core member so that said third magnetic core member is reset only during said other alternate half-cycles of the output of said source, a rectifier connected in series circuit relationship with the reset winding of the four magnetic core members, and still further circuit means for connecting the series circuit including the reset winding of said fourth magnetic core member in parallel circuit relationship with one of said series circuits that includes one of the two gate windings of said second magnetic core member so that said fourth magnetic core member is reset only during said other alternate half-cycles of the output of said source.

9. A two-stage magnetic amplifier in accordance with claim 8, wherein said current-limiting means connected to said first bridge comprises a separate current limiter connected to each side of the input of said first bridge and said another current-limiting means connected to said second bridge comprises a separate current limiter connected to each side of the input of said second bridge.

10. A two-stage magnetic amplifier in accordance with claim 8, wherein switching means is provided for selectively connecting either said series circuit including the reset winding of said third magnetic core member in parallel circuit relationship with said one of said series circuits that includes one of the two gate windings of said first magnetic core member and said series circuit including the reset winding of said fourth magnetic core member in parallel circuit relationship with said one of said series circuits that includes one of the two gate windings of said second magnetic core member, or said series circuit including the reset winding of said third magnetic core member in parallel circuit relationship with said one of said series circuits that includes one of the two gate windings of said second magnetic core member and said series circuit including the reset winding of said fourth magnetic core member in parallel circuit relationship with said one of said series circuits that includes one of the two gate windings of said first magnetic core member, so as to respectively effect either alternating or direct-current voltage across said load.

11. In a full-wave two-stage differential magnetic amplifier adapted to be connected to a source of alternating voltage to effect a voltage across a load, the combination comprising, a first magnetic amplifier stage including a first and a second magnetic core member each having a gate winding disposed in inductive relationship therewith, a second magnetic amplifier stage including a third and a fourth magnetic core member each having a reset winding and a gate winding disposed in inductive relationship therewith, circuit means for connecting first current-limiting means and a first parallel circuit in series circuit relationship with respect to said source, one branch of said first parallel circuit including a first rectifier and the gate winding of said first magnetic core member and the other branch of said first parallel circuit including a second rectifier and the reset winding of said third magnetic core member, other circuit means for connecting second current-limiting means and another parallel circuit in series circuit relationship with respect to said source, one branch of said second parallel circuit including a third rectifier and the gate winding of said second magnetic core member and the other branch of said second parallel circuit including a fourth rectifier and the reset winding of said fourth magnetic core member, said four rectifiers being so poled as to permit only during alternate half-cycles of the output of said source, the flow of current from said source through both branches of both of said parallel circuits, means for resetting the flux level in said first and in said second magnetic core member in accordance with a differential control signal during the other alternate half-cycles of the output of said source when said four rectifiers are blocking the flow of current from said source through both branches of both branches of both of said parallel circuits, still further circuit means for connecting the gate winding of said third magnetic core member and said first current-limiting means in series circuit relationship with respect to said source and for connecting the gate winding of said fourth magnetic core member and said second current-limiting means in series circuit relationship with respect to said source so as to effect a gating of said third and said fourth magnetic core member during said other alternate half-cycles of the output of said source, and still other circuit means for rendering said load responsive to the combined voltage across said first and said second current-limiting means.

References Cited in the file of this patent

UNITED STATES PATENTS

| | | |
|---|---|---|
| 2,904,744 | De Lalio | Sept. 15, 1959 |
| 2,910,643 | Patton | Oct. 27, 1959 |